INVENTORS
JOHN E. CLIFFORD &
BY KEMPES F. TRAGER

Bower & Patalidis
ATTORNEYS

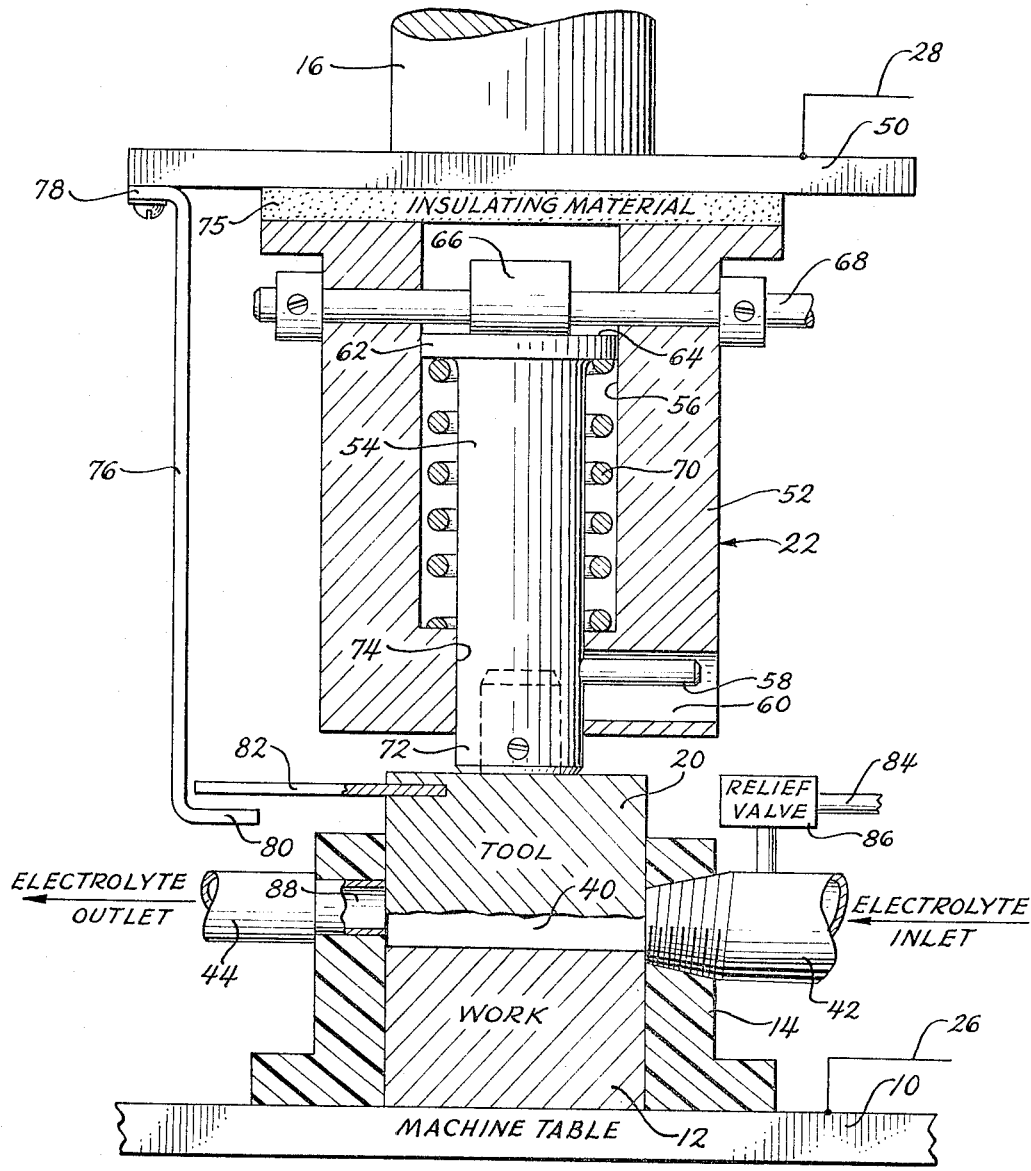

INVENTORS
JOHN E. CLIFFORD &
BY KEMPES F. TRAGER
Bower & Patalidis
ATTORNEYS

United States Patent Office 3,271,283
Patented Sept. 6, 1966

3,271,283
METHODS AND APPARATUS FOR ELECTRO-
CHEMICAL SHAPING OF A WORKPIECE
John E. Clifford, Columbus, Ohio, and Kempes F. Trager,
Detroit, Mich.; said Clifford assignor, by mesne assignments, to The Steel Improvement and Forge Company,
Cleveland, Ohio, a corporation of Ohio, and said Trager
assignor to Ex-Cell-O Corporation, Detroit, Mich.
Filed Oct. 28, 1963, Ser. No. 319,166
8 Claims. (Cl. 204—143)

The present invention relates to methods and apparatus for controlled electrochemical dissolution of material from an electrically conductive workpiece so as to cause a predetermined three-dimensional contour to be shaped upon a selected surface of the workpiece.

It has been known for some time that material may be electrolytically, or electrochemically, removed from an electrically conductive workpiece connected to the positive terminal of a direct current power supply in a configuration where an electrode tool is connected to the negative terminal of the power supply while a current conductive electrolyte is flowed at high velocity, and preferably at substantially high pressure, through the space or gap in the interface between the anodic workpiece and the cathodic tool.

Electrolytic, or electrochemical, machining may be used for hole drilling, cavity sinking, contouring, shaping, turning, cut-off, reaming operations, and the like. Any conventional machining method, i.e. any machining method wherein material is removed from the workpiece chip by chip, has its equivalent in electrochemical machining, on the condition that the workpiece material be electrically conductive. The advantages of electrochemical machining are now well known and undisputed. Among those advantages are: machining of hard, brittle metals and metalloids without tool wear and without physical contact between the tool and the workpiece, without imposing any residual stresses on the workpiece or generating excessive heat on the machined surface of the workpiece and with material removal rates often superior to conventional machining, machining of materials impossible to machine by conventional means and obtaining surfaces finishes generally acceptable without further operation.

A machining operation in which the advantages of electrochemical machining are particularly striking is in the shaping of a workpiece to a predetermined three-dimensional contour. Such a shaping operation is effected by means of an electrode tool having a three-dimensional shape or contour which is an "electrochemical" mirror image of the final article. By "electrochemical" mirror image is meant a shape or contour which is not a true mirror image of the final article. The shape or contour of the electrode tool has generally been obtained by placing the electrode tool and a model of the finished workpiece in an electrochemical machining apparatus and connecting them in the electrical circuit so as to make the tool anodic in regard to the model of the finished workpiece which is rendered cathodic and which is used as a tool to remove material from the surface of the electrode tool.

Where fine three-dimensional details are required to be reproduced upon a workpiece, the fidelity and accuracy of the reproduction is substantially proportional to the narrowness of the gap or interspace between the tool and the workpiece. Exact reproduction of fine details is often impossible because the narrowness of the gap is limited in order to prevent short circuits, such short circuits resulting from the presence of undissolved solid particles trapped between the tool face and workpiece surface or from actual contact therebetween.

Furthermore, in shaping operations where the electrolyte is brought to the interface between the tool and the workpiece by being caused to flow through a number of passageways disposed in the tool substantially normally to the surface of the workpiece, the machined surface presents a number of pimples of undissolved material corresponding to each electrolyte outlet on the face of the tool. This effect on the workpiece is of course undesirable and may be avoided by using a tool having an imperforate face and by forcing the electrolyte to flow substantially parallel to the confronting faces of the tool and workpiece. However it has been found that where the electrolyte path is substantially long, the rate of material removal varies from the point of introduction of the electrolyte to the point of exit. This is due to different electrolyte temperature gradients across the interface, variation in ion concentration and gas concentration, etc. This phenomenon generally results in small inaccuracies in dimensions of the finished workpiece which, although ordinarily falling within the tolerance range of normal manufacturing tolerances, may be objectionable where fine details, such as are present, for example, in artistic engravings, are to be reproduced on the workpiece surface.

The present invention overcomes most of the problems involved in electrochemical shaping of a workpiece where three-dimensional shapes with fine details are to be reproduced with fidelity and accuracy. In general, under the methods and apparatus according to the principles of the present invention, an electrode tool is fed toward the workpiece at a predetermined rate of advance while the tool is continuously vibrated or oscillated towards and away from the workpiece surface. Preferably, the electrolyte is confined between the tool face and the workpiece surface, and the flow of electrolyte is interrupted at the same time as the electric current is allowed to pass through the electrolyte in synchronism with the oscillations or vibrations of the tool, and also in coincidence substantially with the period of time when the tool is closest to the workpiece surface. The invention contemplates to vibrate or oscillate the electrode tool by mechanical, electrical, electromechanical or hydraulic means.

The objects of the invention are therefore: to provide novel means and methods for electrochemical shaping of a workpiece so as to obtain a three-dimensional faithful and accurate "electrochemical" mirror image reproduction of the fine details on the tool face; to provide novel means and methods to effectuate that object without undue complication or excessive manufacturing costs, using electrochemical machining apparatus available on the market, and without the necessity of employing highly skilled labor to operate the equipment.

Other objects and advantages will become apparent from the following description of the invention when considered with the attached drawings, wherein like numerals refer to like or equivalent parts, and in which:

FIGURE 2 is an enlarged view of a portion of the apparatus of FIGURE 1, showing in details an example of the invention utilizing a mechanical oscillating transducer, as a component thereof, for the purpose of oscillating the electrode tool;

Figure 1:
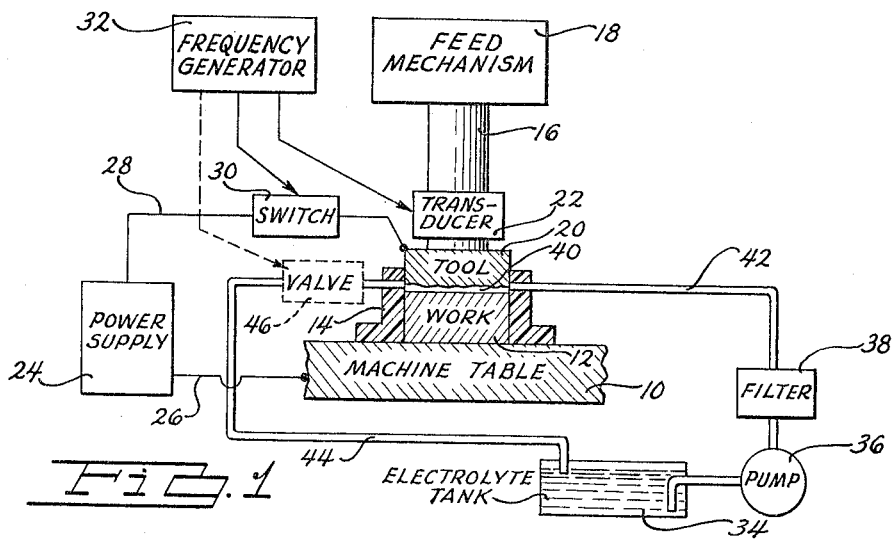
FIGURE 1 is a schematic representation of an apparatus according to the principles of the invention.

Referring now to FIGURE 1 in the drawings, an apparatus according to the invention comprises a machine having a table 10 supporting an electrically conductive workpiece 12 mounted thereupon by means of a fixture or jig 14, made of electrically non-conductive material. The table may be directly supported by the base of the machine, or it may be supported from the base by means of longitudinally and transversely movable cross-slide members rendering the table movable in all directions in the manner generally provided in respect to boring and milling machines, and the like, or alternately, the table may be movable longitudinally, transversely and in rotation.

The apparatus also comprises a ram 16 which is linearly movable perpendicularly to the machine table by means of a feed mechanism 18, which may be any type of well known electromechanical or hydraulic servo mechanism. An electrode tool 20 is mounted on the end of the ram 16, an oscillating or vibrating transducer 22 being interposed between the ram end and the electrode tool.

A power supply 24 is provided with two terminal cables 26 and 28 connected respectively to the workpiece 12 and the electrode tool 20. A switch mechanism 30 is interposed in the connection between the power supply 24 and the electrode tool 20, the operation of the switch mechanism 30 being controllable by means of a timing device such as frequency generator 32 which is also adapted to control the operation of the oscillating or vibrating transducer 22 in synchronism with the closing and opening of the switch mechanism 30. The switch mechanism 30 may be a mechanically actuated electric switch or any electronic switching arrangement well known in the art.

An electrolyte, pumped from an electrolyte tank 34 by means of a pump 36, is caused to flow under pressure, through a filter 38, to the interface 40 between the tool 20 and the workpiece 12, by way of inlet pipe 42. From the tool-workpiece interface, the electrolyte is returned to the electrolyte tank 34 by way of outlet pipe 44. A valve 46 may be disposed in the electrolyte circuit at any convenient place, and, in applications where such a valve is used, it is operated in synchronism with both the switch mechanism 30 and the oscillating or vibrating transducer 22 by way of, and under the control of, the frequency generator 32. However, it has been found that valve 46 is not absolutely necessary in some operations according to the invention, as will be explained hereinafter in more details.

The electrically non-conductive fixture or jig 14 securely holds the workpiece 12 in place on the machine table 10 and, at the same time, provides an enclosure confining the electrolyte in the interface or gap 40 between the confronting faces of the workpiece 12 and electrode tool 20. The electrode tool snugly fits in the top of the fixture or jig in a manner substantially similar to a piston fitting the bore of a cylinder.

Preparatory to operating the apparatus of FIGURE 1, the ram 16 of the machine is advanced by means of the feed mechanism 18 until the narrowest space separating the surface of the workpiece from the top of the highest protrusion on the electrode tool face is greater than the stroke amplitude of the oscillating or vibrating transducer 22. The electrolyte flow is started, the valve 46 being open, and the frequency generator 32 is turned on. The main switch of the power supply 24 is turned on, and the feed mechanism 18 is started so as to advance the electrode tool 20 toward the workpiece at a velocity commensurate with the rate of material removal from the workpiece surface.

Figure 5:
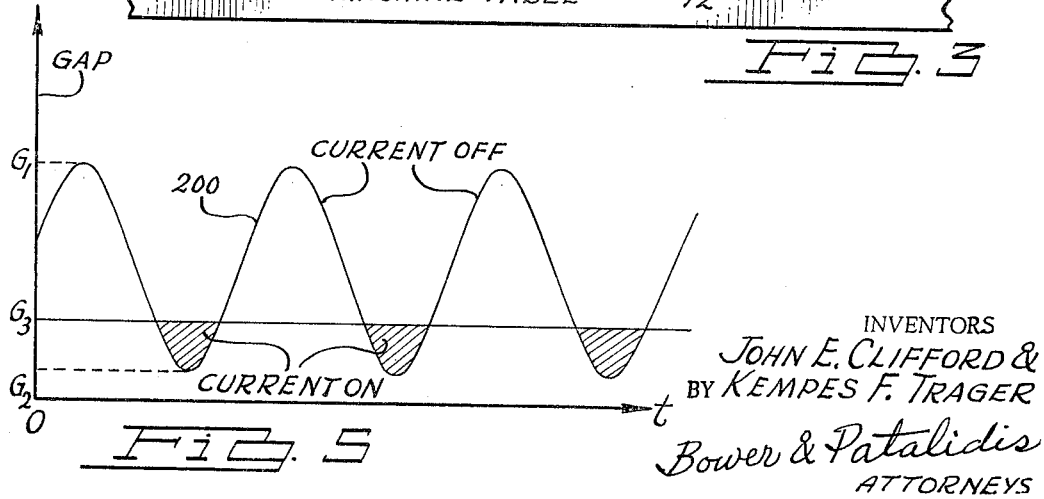
FIGURE 5 is a graph representing the variation of tool-workpiece gap in function of time according to the invention.

The frequency generator 32, controlling the operations of the oscillating or vibrating transducer 22, of the electrical switch mechanism 30 and of the valve 46, insures that the transducer, the switch mechanism and the valve operate in coordination and in synchronism. As an example of typical operation according to the invention, when the oscillating or vibrating transducer causes the active face of the electrode tool 20 to be displaced from a position of maximum gap $G_1$ (FIGURE 5) to a position of smaller gap $G_3$, in closer proximity to the workpiece surface, valve 46 is operated to interrupt the flow of electrolyte through the interface 40. Switch mechanism 30 closes so as to momentarily connect the electrode tool and workpiece to the power supply 24 in such a manner and with such respective polarities that the electrode tool is cathodic and the workpiece anodic. Contemporaneously, the electrode tool face continues on its stroke to minimum gap $G_2$ between the tool face and the workpiece surface and retracts to a position presenting again gap $G_3$. When gap $G_3$ is reached the frequency generator 32 sends a signal causing valve 46 to open, thus reestablishing the flow of electrolyte through the interface 40 and flushing away the products formed in the electrolyte during the electrochemical dissolution of material from the workpiece resulting from the passage of current through the interface, the frequency generator signal simultaneously causing the switch mechanism 30 to open so that no electrolytic action occurs while the electrode tool face is displaced back to the position of maximum gap $G_1$ and while the interface 40 is again filled with fresh electrolyte. FIGURE 5 shows a curve 200 representing these variations of the gap between the electrode tool face and the workpiece surface for the purpose of indicating an example of proportions between "current on" and "current off" intervals during consecutive oscillations or vibrations of the electrode tool.

It will be noted that when the flow of electrolyte through the interface is interrupted the electrode tool, being still displaced toward the bottom of its stroke resulting in the minimum gap $G_2$, applies considerable pressure upon the electrolyte confined in the interspace between the tool face and the workpiece surface. This high electrolyte pressure prevents boiling of the electrolyte, even though current densities as high as several thousands amperes per square inch are normally passed through the gap, causing heating of the electrolyte above its boiling point at atmospheric pressure. Furthermore, the hydrogen gas bubbles formed at the cathode during the electrolysis are considerably reduced in size, consequently the practical area of electrolyte capable of carrying electrical current is proportionally increased so that the above mentioned high current densities, resulting in high material removal rates, may be customarily employed.

A further advantage of the method of the invention is due to the fact that every time the electrical current is turned on, non-flowing fresh electrolyte is confined in the interface 40 permitting electrochemical dissolution of the workpiece surface under identical conditions over the whole affected area, such as: same pressure, same ion concentration, same temperature. The amount of material removed from the workpiece surface is only affected by the closeness or remoteness of partial areas of the electrode tool face from the workpiece surface, more material being removed from the workpiece from the areas confronting protrusions on the tool face until every such protrusion has caused a corresponding depression to be shaped on the workpiece surface.

A further advantage of the method and apparatus of the invention is due to the fact that the pumping action of the oscillating or vibrating tool helps in flushing from the gap the products resulting from the electrochemical dissolution of the workpiece at the same time that any short circuit that may be caused by solid particles being lodged between the tool face and the workpiece surface, when the tool is at the bottom of its stroke, will be automatically broken as soon as the tool face is retracted away from the workpiece.

It is to be noted that the presence of valve 46 interrupting the electrolyte flow is not absolutely necessary in some operations. The porting of the electrolyte inlet pipe 42 and, or, outlet pipe 44 in the enclosure of the fixture or jig 14 may be disposed in such a manner that the electrode tool 20, by its own reciprocating motion within the fixture or jig, occults and opens the pipe ports at the appropriate moment. This arrangement is particularly feasible where the amplitude of oscillation of the electrode tool is substantial and where the total length of advance of the tool into the workpiece is substantially small as, for example, is the case where the distance separating the level of the highest protuberance from the lowest depression on the tool is relatively small. A typical example thereof would be a medal or coin engraving which is sought to be reproduced upon a die.

It has been discovered that voltages between 2 and 18 volts and instantaneous current densities as low as 5 and as high as 5,000 amperes per square inch and more are well suited to operations according to the invention. The electrode tool may be reciprocated between 1 and 60 cycles per second and the amplitude of its stroke may be as small as .001 inch or as large as .250 inch.

Although the power supply 24 may be a direct current power supply, the workpiece being connected to the positive terminal and the electrode tool being connected to the negative terminal, it may also consist of a source of alternating current. When an alternating current power supply is used, the transducer 22 is operated at the same frequency as that of the power supply, and the switch mechanism 30 is controlled so as to time the switching on and off of the machining electrical current in such a manner as to coincide substantially both with the time when the electrode tool reaches the end of its stroke and the portion of the sinusoidal curve of the voltage variation across the tool-workpiece cell that makes the tool cathodic in relation to the workpiece.

Figure 6:
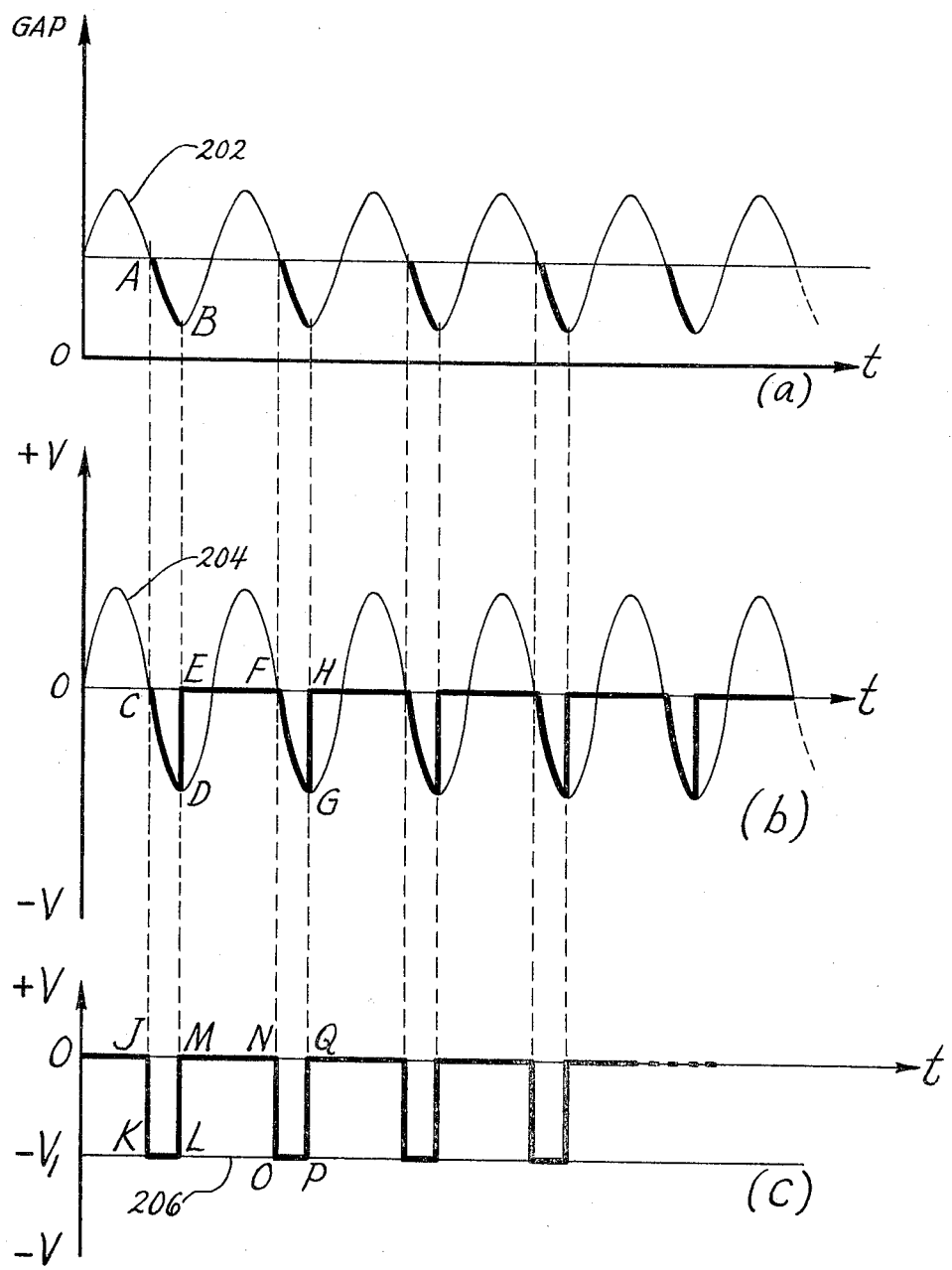
FIGURE 6 represents graphs comparing the variation of tool-workpiece gap to the voltage variation across the gap.

Referring to FIGURE 6, wherein there is plotted a curve 202 (FIGURE 6a) representing the variation of gap between the electrode tool face and the workpiece surface in function of time, curve 204 (FIGURE 6b) represents a variation of an alternating voltage applied across the electrode tool-workpiece gap, plotted on a time abscissa of the same scale as the time abscissa of curve 202; curves 202 and 204 have consequently the same frequency and are in phase. If it is desired, for example, to turn on the electric current through the gap during the time corresponding to portion AB of curve 202, consequently during the period of time wherein the electrode tool is oscillated from a position of medium gap to a position of minimum gap in relation to the workpiece, the electric current is turned on during portion CD of voltage curve 204, consequently during a portion of the period of the voltage variation when the voltage of the tool varies from substantially zero to maximum negative voltage, resulting in the tool being at all time cathodic in relation to the workpiece during the time when the electric current is allowed to pass through the electrolyte in the interface. When the current is switched off, the negative voltage falls off to zero and the voltage applied to the tool follows a portion CDEFGH of the graph of FIGURE 6b.

If a constant negative voltage represented by curve 206 (FIGURE 6c) is applied to the electrode tool and current allowed to flow only during portion AB of curve 202, the voltage imposed upon the tool is pulsed and is substantially according to curve JKLMNOPQ of FIGURE 6c.

As previously mentioned, the oscillating or vibrating transducer 22 (FIGURE 1) may be any mechanism capable of oscillating or vibrating the electrode tool. The transducer may be a piezoelectric crystal, an electromagnet, a mechanical or a hydraulic device.

Figure 3:
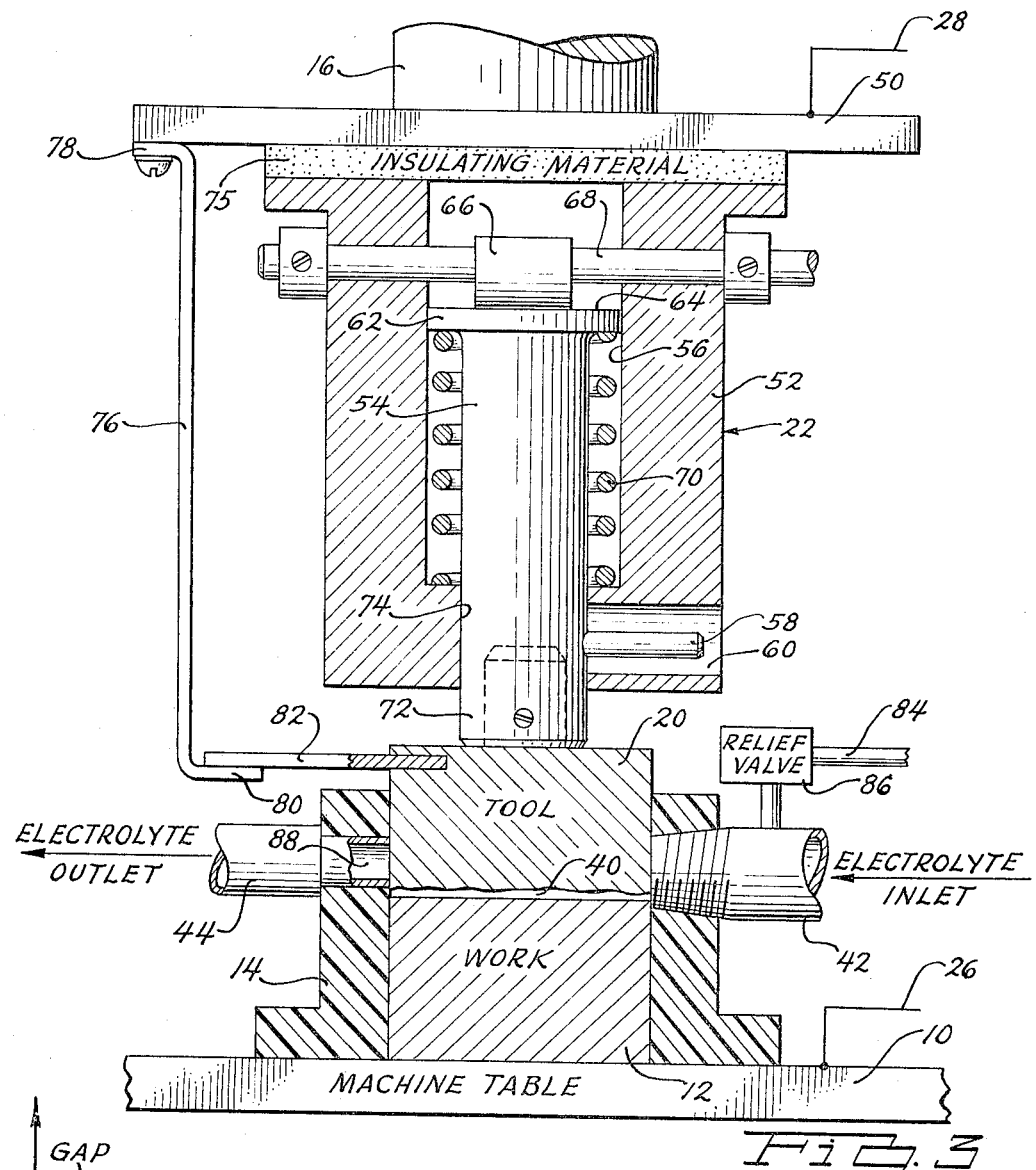
FIGURE 3 is a view similar to FIGURE 2 with some elements displaced to a different position, so as to illustrate the functioning of the device.

Referring now to FIGURES 2 and 3, which schematically illustrate an apparatus incorporating an example of a mechanical oscillating transducer, a workpiece 12 is shown clamped on the machine table 10 by means of a jig or holding fixture 14. The ram 16 of the machine is provided with a platen 50 upon which is mounted the oscillating transducer 22. The oscillating transducer comprises a housing 52 provided with a rod member 54 slidably mounted in a bore 56 in the housing. The rod member 54 is provided with a pin 58 disposed in a slot 60 in the housing 52, for the purpose of preventing the rod member from rotating in relation to the housing. The rod member 54 has an enlarged end portion 62 with a surface 64 disposed in contact with a cam member 66 supported by a shaft 68 which is rotatable by any appropriate means, such as an electric motor (not shown). A coil spring 70 is adapted to maintain the surface 64 of the shoulder portion of the rod member 62 in contact with the cam member 66, and the other end 72 of the rod member 54 projects through an end bore 74 in the housing 52 and supports the electrode tool 20 mounted thereon by any conventional means.

The housing 52 is insulated from the machine platen 50 by a sheet 75 of insulating material. An electrical contact member 76 has one end 78 fastened to the machine platen 50 and another end 80 disposed to cooperate with a resilient second contact member 82 fastened to the electrode tool 20.

Electrolyte is introduced to the interface 40 between the electrode tool face and the workpiece surface by means of inlet pipe 42 having a by-pass return pipe 84 connected to the electrolyte tank (not shown) through a relief valve 86. At least one electrolyte outlet port 88 is provided for returning the electrolyte from the interface to the electrolyte tank by way of outlet pipe 44.

Electrical cable 28 connects one terminal of the power supply (not shown) to the platen 50 and electrical cable 26 connects the machine table 10, and consequently the workpiece 12 in electrical contact therewith, to the other terminal of the power supply.

The electrode tool 20 is designed in such a way as to snugly fit within the fixture or jig 14 so as to act substantially like a piston in a cylinder. The port 88 of the electrolyte outlet pipe 44 is disposed in relation to the electrode tool 20 and the workpiece 12 so as to be substantially uncovered when the tool occupies the position shown in FIGURE 2, and as to be occluded when the tool occupies the position shown in FIGURE 3.

Prior to operating the apparatus, the ram 16 of the machine is advanced until the electrode tool 20 is introduced within the fixture or jig 14, the space separating the face of the tool from the workpiece surface being, however, large enough to prevent the tool face from contacting the workpiece surface when the tool is oscillated. Electrolyte flow through interface 40 is started and the motor rotating shaft 68 is turned on. Rotation of shaft 68 causes cam 66 to reciprocate the rod 52 and consequently the electrode tool 20. When the electrode tool 20 occupies the position illustrated in FIGURE 2, the electrolyte is free to flow through the interface 40 and electrical contact member 82 being out of contact with member 80, the electrical circuit is open. When the shaft 68 has rotated approximately 180 degrees, thereby causing cam 66 to occupy the position illustrated in FIGURE 3, the electrode tool 20 has been displaced in such a way that the electrolyte outlet port 88 is occluded and the electrical circuit is closed through electrical contact members 82 and 80 now engaging one another. The flow of the electrolyte through the interface 40 is consequently interrupted in synchronism with the passage of electrical current across the interface and the electrolyte is placed under considerable pressure that prevents the formation of steam bubbles, even though a very high current is flowing therethrough, and which decreases the size of hydrogen gas bubbles being formed during the electrolysis. The ram effect, resulting from the sudden interruption of flow of electrolyte at a time when the electrode tool continuing on its stroke further increases the electrolyte pressure, is absorbed by means of a relief valve 86 and a bypass pipe 84 returning to the electrolyte tank. The relief valve 86 may be adjusted so as to open only at a predetermined high pressure of the electrolyte.

The relative positions of contact members 80 and 82 in such as to allow electrical current to pass through the interface 40, in the direction that makes the tool cathodic and the workpiece anodic, during a predetermined portion of the electrode tool stroke corresponding substantially to a variable minimal gap, as explained hereinbefore. The electric motor rotating the shaft 68 is the equivalent of the frequency generator 32 of FIGURE 1 and its angular velocity determines the frequency of operation of the system while controling and synchronizing the operation of the switch mechanism, consisting of contact members 80 and 82, with the interruption of electrolyte flow and the oscillation of the electrode tool.

Figure 4:
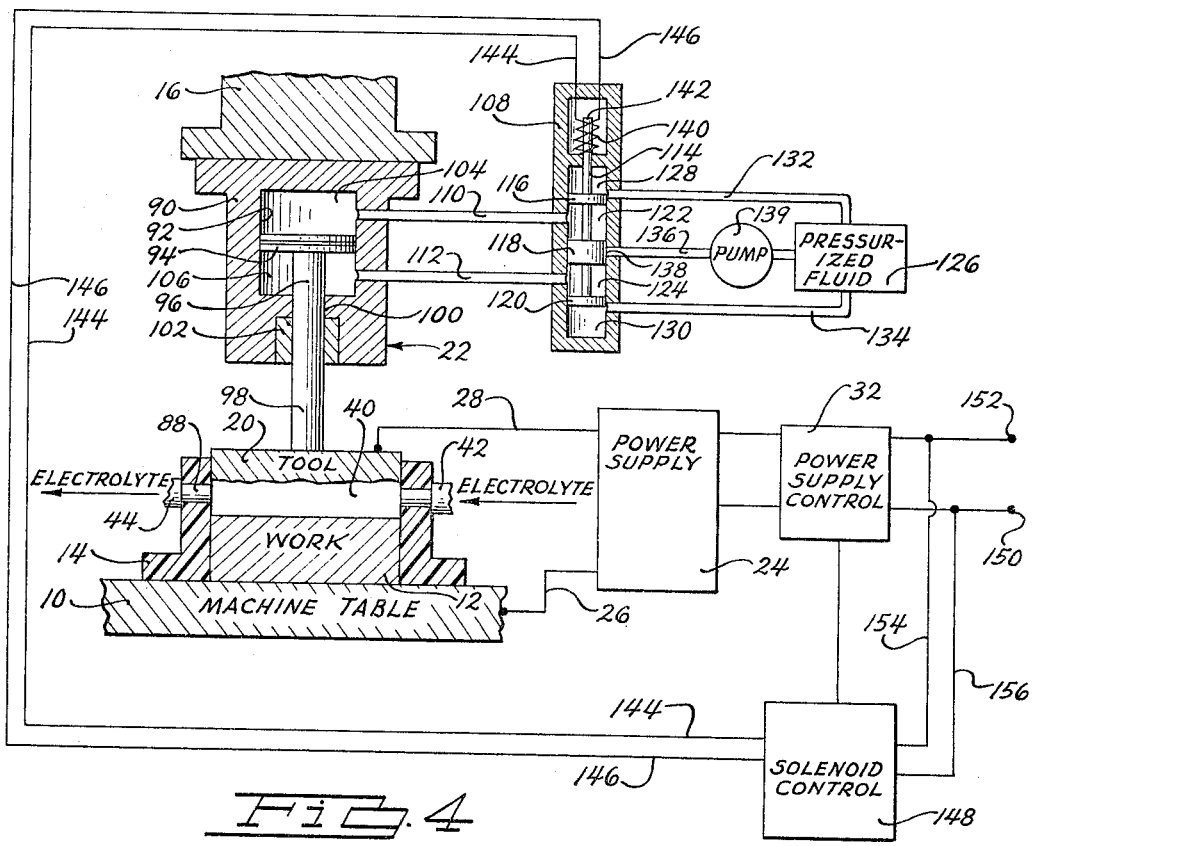
FIGURE 4 is an alternate embodiment of the apparatus of FIGURE 1, representing an example of the invention utilizing a hydraulic oscillating transducer, as a component thereof, for the purpose of oscillating the electrode tool.

FIGURE 4 represents an example of hydraulic means for oscillating the electrode tool in accordance with the principle of the invention. In the example of FIGURE 4, the oscillating transducer 22 comprises a hydraulic cylinder housing 90 having a cylinder bore 92 in which is slidably disposed a piston member 94. The piston member is operatively connected to a rod 96 having one end 98 projecting on the outside of the cylinder housing 90 through an end bore 100 provided with a bushing gasket 102. The electrode tool 20 is supported on the end 98 of the piston rod 96.

The piston member 94 divides the cylinder bore 92 into chambers 104 and 106 connected to a valve housing 108 by means of pipes or conduits 110 and 112, respectively. A valve spool 144, provided with lands 116, 118 and 120, is slidably disposed in the valve housing 108. Pipe 110 leads into an annular chamber 122 and pipe 112 leads into an annular chamber 124, annular chamber 122 and 124 being disposed on both sides of land 118. A source of pressurized fluid 126 supplies fluid under pressure to annular chambers 128 and 130, situated behind lands 116 and 120 respectively, by way of pipes or conduits 132 and 134. A return pipe or conduit 136 leads into a port 138 in the valve housing 108, port 138 being normally obturated by land 118 of the valve spool 114, and fluid exhausted through pipe 136, after being pressurized by pump 138, is returned to the reservoir of pressurized fluid 126.

One end of the valve spool 114 constitutes a plunger 142 disposed within a solenoid coil 140 having its terminal wires 144 and 146 connected to a solenoid control 148, which is connected in turn to terminals 150 and 152 of a source of pulsed or alternating current electric power by means of wires 152 and 156. Terminals 150 and 152 are also connected to a power supply 24 through a power supply control 32 which is adapted to turn the power supply 24 on and off and which also controls the solenoid control 148 so as to turn the solenoid 140 on and off in synchronism with the turning on and off of power supply. The power supply 24 is provided with two terminal wires 26 and 28 connected respectively to the machine table 10, and consequently to the workpiece 12, and to the electrode tool 20.

The operation of the apparatus of FIGURE 4 is identical to the operations of the apparatus of FIGURES 1, 2 and 3. If the power supply 24 is a source of alternating current, the power supply control 32 is adjusted to synchronize the solenoid control 148 with the frequency of the power supply voltage and to adjust the voltage variation phase so that the electrode tool minimum gap with the workpiece coincides with the passage of current through the interface 40, in the direction that makes the tool cathodic in relation to the workpiece as hereinbefore explained. When utilized with a direct current power supply, the power supply control 32 is adjusted to key or time the opening and closing of the electrical current through the interface to be in coincidence with the occurrence of the oscillations of the electrode tool as determined by the frequency of operation of the solenoid coil 140. It can be seen that the stroke of the electrode tool and its frequency of oscillation may be conveniently adjusted to any appropriate values by proper setting of the operating frequency of the power supply control 32, which is the equivalent of the frequency generator 32 of FIGURE 1.

From the foregoing description of the invention as embodied in several alternative variations, it will be appreciated that many changes may be made both in the method and in the apparatus without departing from the spirit and scope of the invention.

Having thus described the invention, what is claimed as new and useful is:

1. Apparatus for electrochemically shaping the surface of an electrically conductive workpiece to a predetermined three-dimensional contour comprising:

an electrically conductive tool provided with a working face having a contour, shape and area corresponding substantially to the contour, shape and area with which the workpiece is to be provided;

feeding means for advancing said tool toward said workpiece at a substantially constant velocity corresponding to the rate of removal of material from said workpiece so as to prevent contact between said tool and said workpiece;

means for oscillating said tool in the same direction as the direction of advance of said tool, the amplitude of said tool oscillations being such as to avoid contact between said tool and said workpiece;

means for confining an electrically conductive electrolyte in a confined space within the gap between said tool and said workpiece;

means for flowing said electrolyte through said confined space within the gap between said tool and said workpiece;

means for interrupting said flow of electrolyte through said confined space within the gap in synchronism with the oscillations of said tool at a predetermined time at least shortly before said tool reaches a position of minimal spacing from the workpiece; and means for reestablishing the flow of electrolyte in synchronism with said oscillations at a predetermined time at most shortly after the tool has reached said position of minimal spacing from the workpiece;

and means connecting said tool and said workpiece in an electrical circuit to effect passage of current in a manner as to make said tool cathodic in relation to said workpiece only when said flow of electrolyte is interrupted.

2. The apparatus of claim 1 wherein the means for oscillating said tool is a piezoelectric crystal.

3. The apparatus of claim 1 wherein the means for oscillating said tool is an electromagnetic vibrator.

4. The apparatus of claim 1 wherein the means for oscillating the tool comprises an oscillating push rod member biased against an eccentric cam member adapted to be rotated by an electric motor, said push rod member being operatively connected to said tool.

5. The apparatus of claim 1 wherein the means for oscillating the tool comprises a hydraulic cylinder, a piston member reciprocable in said cylinder, a rod member integral with said piston member and extending outside of said cylinder, said rod member being operatively connected to said tool, and means for introducing fluid into said hydraulic cylinder alternatively on both sides of said piston member so as to cause said piston member to reciprocate in said cylinder.

6. Apparatus for electrochemically shaping the surface of an electrically conductive workpiece to a predetermined three-dimensional contour comprising:
an electrically conductive tool provided with a working face having a contour, shape and area corresponding substantially to the contour, shape and area with which the workpiece is to be provided;
feeding means for advancing said tool toward said workpiece;
means for oscillating said tool in the same direction as the direction of advance of said tool while avoiding contact between said tool and said workpiece;
chamber means providing an enclosed passage for electrolyte between said tool and said workpiece;
means for supplying an electrolyte within the gap between said tool and said workpiece;
means for interrupting said flow of electrolyte through said gap in synchronism with the oscillations of the tool at a predetermined time at least shortly before said tool reaches a position of minimal spacing from the workpiece;
means for reestablishing said flow of electrolyte in synchronism with said oscillations at a predetermined time at most shortly after the tool has reached said position of minimal spacing from the workpiece;
and means connecting said tool and said workpiece in an electrical circuit to effect passage of current in a manner as to make said tool cathodic in relation to said workpiece only when said flow of electrolyte is interrupted.

7. A method for electrochemically shaping the surface of an electrically conductive workpiece to a predetermined three-diemnsional contour comprising:
disposing in close proximity to the workpiece an electrically conductive tool provided with a working face having a contour, shape and area corresponding substantially to the contour, shape and area with which the workpiece is to be provided;
advancing said tool toward said workpiece at a substantially constant velocity corresponding to the rate of removal of material from said workpiece so as to prevent contact between said tool and said workpiece;
oscillating said tool in the same direction as the direction of advance thereof, the amplitude of said tool oscillations being such as to avoid contact between said tool and said workpiece;
flowing an electrolyte through a confined space within the gap between said tool and said workpiece;
interrupting said flow of electrolyte through said confined space within the gap in synchronism with the oscillations of said tool at a predetermined time at least shortly before said tool reaches a position of minimal spacing from the workpiece;
reestablishing said flow of electrolyte in synchronism with said oscillations at a predetermined time shortly after said tool has reached said position of minimal spacing from said workpiece;
connecting said tool and said workpiece in an electrical circuit to effect passage of current as said flow of electrolyte is interrupted; and
disconnecting said circuit from said tool and said workpiece after a predetermined time.

8. A method for electrochemically shaping the surface of an electrically conductive workpiece to a predetermined three-dimensional contour comprising:
disposing in an enclosed chamber an electrically conductive tool provided with a working face having a contour, shape and area corresponding substantially to the contour, shape and area with which the workpiece is to be provided;
advancing said tool toward said workpiece;
oscillating said tool in the same direction as the direction of advance thereof while avoiding contact between said tool and said workpiece;
flowing an electrolyte within an enclosed passage between said tool and said workpiece;
interrupting said flow of electrolyte through said passage in synchronism with the oscillations of said tool at a predetermined time at least shortly before said tool reaches a position of minimal spacing from the workpiece;
reestablishing said flow of electrolyte in synchronism with said oscillations at a predetermined time at most shortly after the tool has reached said position of minimal spacing from the workpiece;
and connecting the tool and the workpiece in an electrical circuit to effect passage of current in a manner as to make said tool cathodic in relation to said workpiece only when said flow of electrolyte is interrupted.

References Cited by the Examiner

FOREIGN PATENTS 789,293   1/1958   Great Britain.

JOHN H. MACK, *Primary Examiner*.

R. K. MIHALEK, *Assistant Examiner*.